Jan. 3, 1967 C. F. SWINEHART ETAL 3,296,448
SCINTILLATION DETECTOR COMPRISING A TRANSPARENT TIN-ACTIVATED
CALCIUM IODIDE SCINTILLATOR
Filed Jan. 21, 1964 3 Sheets-Sheet 1

CARL F. SWINEHART, ROBERT HOFSTADTER, INVENTORS
and EARL W. O'DELL

BY *Robert K. Mikulek*
ATTORNEY

Jan. 3, 1967  C. F. SWINEHART ETAL  3,296,448
SCINTILLATION DETECTOR COMPRISING A TRANSPARENT TIN-ACTIVATED
CALCIUM IODIDE SCINTILLATOR
Filed Jan. 21, 1964  3 Sheets-Sheet 2

CARL F. SWINEHART, ROBERT HOFSTADTER, INVENTORS
and EARL W. O'DELL
BY *Robert F. Michalek*
ATTORNEY Jan. 3, 1967 C. F. SWINEHART ET AL 3,296,448
SCINTILLATION DETECTOR COMPRISING A TRANSPARENT TIN-ACTIVATED
CALCIUM IODIDE SCINTILLATOR
Filed Jan. 21, 1964 3 Sheets-Sheet 3

CARL F. SWINEHART, ROBERT HOFSTADTER, INVENTORS
and EARL W. O'DELL
BY Robert H. Mihalek
ATTORNEY 3,296,448
SCINTILLATION DETECTOR COMPRISING A TRANSPARENT TIN-ACTIVATED CALCIUM IODIDE SCINTILLATOR
Carl F. Swinehart, University Heights, Ohio, Robert Hofstadter, Stanford, Calif., and Earl W. O'Dell, Cleveland Heights, Ohio, assignors to The Harshaw Chemical Company, Cleveland, Ohio, a corporation of Ohio
Filed Jan. 21, 1964, Ser. No. 339,164
4 Claims. (Cl. 250—71.5)

This invention relates to a new fluorescent material having particular use as a scintillator and more particularly the invention relates to a scintillator comprising tin-activated calcium iodide.

Fluorescent materials have been known for many years. They have ben used in many areas and their use is being continually expanded. Fluorescent materials such as the sulfides, tungstates and phosphates of zinc have been used as luminescent screens for television sets, fluoroscopes and the like. Many of these phosphors respond to ultraviolet and radiation of various wave lengths but only emit feeble flashes of light when exposed to gamma radiation.

One important area in which phosphors may be used is the detection and measuring of ionizing radiations by the combinations of a luminescent crystal (phosphor) and a photomultiplier tube. Early work on this was done by Kallman [Natur and Technik (July 1947)] using large pieces of naphthalene. Anthracene and phenanthrene (coal derivatives) also were used with success. [See R. J. Moon, Phys. Rev. 73, 1210 (1948)]. Of these anthracene proved to be most useful.

When used with ionizing radiations such as 1.0 mev. gamma rays the light output of anthracene is not many times that of the background noise of the photomultiplier tube; anthracene having a relatively small density fails to stop enough of the gamma rays to respond adequately.

With the advent of thallium-activated sodium iodide crystals, it has been possible effectively to convert high energy ionizing radiations (X-rays, gamma rays and the like) to light energy. See Hofstadter, U.S. Patent 2,585,-551. Crystalline bodies of sodium iodide are produced advantageously as an optically integral mass sufficiently large to capture enough of a given radiation to be useful; they are extremely transparent and, therefore, effectively transmit their own fluorescence. When doped or activated with thallium, a sodium iodide crystal becomes an excellent scintillator having an integrated light output of about twenty times that of thallium-free sodium iodide at room temperature.

Moreover, thallium-activated sodium iodide crystals convert the bulk of the radiation energy to a light flash in the region of high spectral sensitivity of photomultiplier tubes. The duration and rise of the light pulse (decay time constant) is such that each pulse can be distinguished by the photomultiplier; the converted signals may be counted or integrated effectively. The most significant properties of thallium-activated sodium iodide are its relatively high density (three to four times that of the organic scintillators) and its higher composite atomic number. Sodium iodide has a composite atomic number of 32 while anthracene has a composite atomic number of 3.9.

Subsequent investigations of new compositions for use as scintillators have characteristically proceeded along the lines of developing materials having higher densities and higher composite atomic numbers and which produce large light flashes in the region of the spectrum to which photomultiplier tubes are most responsive. After these prime requisites were found in a material, the duration of the light output determined whether or not the material could be used effectively as a scintillator.

Since the discovery of thallium-activated sodium iodide, scintillation counters and the like have been increasing in use. With this increasing use, the investigation of many materials in an effort to uncover better scintillators or scintillators having selective utility has paralleled the expansion of the counters. Many materials resulted having high luminescence when executed with excited ultraviolet, etc., but were not useful as a scintillator; they had poor response to gamma ray radiation or poor time constant, etc.

Because of their development, scintillators generally are understood to be materials having the properties outlined above; materials when exposed to ionizing radiations are capable of emitting light flashes in the region of spectral sensitivity of a photomultiplier tube. Materials having excellent properties for use as scintillators are usually not so effective when used with other light detecting means and devices. Cadmium sulfide photoconductive cells and the like have a spectral sensitivity more nearly approximating that of the eye. The photoconductive cells, for example, while having spectral sensitivities overlapping those of photomultiplier tubes, have their peak response in the green region (5100–5700 angstroms) of the spectrum. Scintillation crystals which respond most effectively to ionizing radiations such as thallium-activated sodium iodide (see Hofstadter supra), thallium-activated calcium iodide [see Van Sciver et al., Physical Review 84, 5 (1951)], europium-activated calcium iodide (see Hofstadter copending U.S. application Serial No. 296,518, filed July 22, 1963) and calcium iodide optical crystals (see copending U.S. application Serial No. 316,665, filed October 16, 1963) have their emission peak in the blue (4,000–5,000 angstroms).

Where it is desirable to detect ionizing radiations visually or with certain light detecting devices such as cadmium sulfide photoconductive cells which are more sensitive to green light, scintillation crystals other than the above must be used. Materials having such utility include thallium-activated potassium bromide, thallium-activated cesium iodide and thallium-activated cesium bromide. While useful because of their spectral emission, they have a relatively low light output compared to standard thallium-activated sodium iodide.

It has now been discovered that calcium iodide activated with tin emits strongly in the green region of the spectrum when exposed to gamma radiation. Moreover, the tin-activated calcium iodide is substantially as good as standard thallium-activated sodium iodide in overall light output; the relative pulse heights are about the same.

The crystals of the present invention may then be considered to be useful with all of the conventional light detecting means currently being used, including those systems designed for detecting, counting and integrating ionizing radiations.

The tin-activated calcium iodide crystals of the present invention are prepared conveniently by any one of several procedures known to work for other hygroscopic iodides using reagent grade reactants preferably. The calcium iodide is then dehydrated. During dehydration, the material is preferably kept on the acid side and heated under controlled conditions to prevent reaction between the calcium iodide and the water of crystallization or any oxygen that may be present. The formation of calcium oxide degenerates the scintillation properties. Even though the material containing calcium oxide may emit light as a phosphor, it can not be used as a scintillator.

The dehydrated calcium iodide is then mixed with the desired amount of a tin-activating compound and fused in an inert environment and grown as a single crystal or as an optically integral polycrystalline mass according to the Stockbarger-Bridgman procedure (U.S. Patent 2,149,076), the Kyropoulos-Czochralski prodecure [Z. Phys. Chem. 92, 219 (1917)] or the Verneuil procedure (C. R. 135, pps. 791–4, 1902).

The resulting crystalline material, comprising calcium iodide activated with tin provides a scintillator characterized by having a fluorescent emission peak at $5300\pm60$ angstroms and having an emission band ranging from less than 3500 to about 6000 angstroms. The scintillators of the present invention are optically integral and exhibit excellent light transmission having a minimum of absorption in the emitting wave length band.

The tin-activated calcium iodide crystals of the present invention are the first materials competitive with standard thallium-activated sodium iodide as a scintillator which have practical utility as a visual radiation detector. The tin-activated calcium iodide crystals of the present invention may be used with the eye or they may be used with the light detectors having spectral sensitivity comparable to the eye.

The fact that tin when used in very small amounts (15 p.p.m. to 350 p.p.m.) changes the emission characteristics of crystalline calcium iodide so strikingly without significantly affecting its scintillation properties (light output, decay time, etc.) is unexpected. Calcium iodide when blended with much larger amounts of tin (0.1 percent or more) fused and solidified to form an integral mass becomes a phosphor (British Patent 492,722) which can not be used as a scintillator.

The tin-activated calcium iodide scintillators of the present invention being hygroscopic deteriorate rapidly in the ambient atmosphere. In order to take advantage of the crystal's scintillation properties, the crystals must be kept in a substantially anhydrous environment. Conveniently, the crystal is "canned" in a hermetically sealed container having an optical window providing for communication of light. The crystal may be coupled optically to the inner side of the window with an optical fluid, or the crystal may be supported within the container at a suitable vantage point so the fluorescence of the crystal may be observed from the outer side of the window. Preferably, the container or a part thereof is composed of a radiation permeable material.

The tin-activated calcium iodide crystals of the present invention particularly may be used as the light emitting component of a fluoroscope screen. Uniformly cut pieces of the crystals are bonded in a mosaic by an opaque resin such as pigmented epoxy or white rubber or the like as the optical partition. Preferably the partitioning material should be light reflective in character. Screens produced in such a manner are many times as sensitive to X-rays as are the current zinc sulfide screens.

For the purposes of the present invention, the expression "optically integral" means that there is an optical coupling between parts of the whole body and a window or a reflector-free area thereon from which the emitted light is removed. In bodies with the simplest geometry, over half of the light originating at any point therein travels a complex path with numerous reflections from the surface of the body or outside reflection. To be useful as a radiation detector, the efficiencies of the light paths from all points in the body to the window of an optically integral mass should be high enough to affect the detector and when surrounded by a good reflector, nearly equal. The efficiency of the paths ultimately affects the pulse height or signal strength, and the equality or efficiency of the various paths affects the resolution.

That a mass is optically integral is generally apparent to the eye of one experienced in preparing and testing devices with the material in question. It is immediately evident in the pulse height and resolution of a scintillator when other factors or parameters have proper relationship and value.

The properties required of a scintillator detector device are as follows: the crystal should be optically integral, have good efficiency of energy conversion, have the desirable geometry of the mass for energy absorption, and have the desirable geometry of the mass for light emission, reflector surface quality, and window surface quality. The reflector surrounding the crystal must have a high efficiency of reflection and be uniformly and intimately fitted against against the surface of the crystal. The window or light-pipe which may be nothing more than a portion of the crystal's surface not covered by the reflector, must have a good uniform optical coupling with the mass of the crystal and have a good light transmitting efficiency from the crystal to the light detector.

Materials prepared by casting or by grinding to a fine powder (10–100 microns) are not optically integral; they do not provide a system which provides the characteristics as described above. Cast crystalline materials are not optically integral because of the random crystalline growth of the material. A cast crystalline body is a matrix of numerous tiny crystals and minute voids caused by the non-uniform growth pattern and shrinkage. It is possible, however, to have a substantially optically integral bulk solid (powder) if the particle size is large enough. Depending on the index of refraction, it is possible to "grow" a single crystal such as those grown by the above procedures and then reduce the crystal to a particle size above a certain limit and spread out to permit light to travel to the detector. Ideally, however, a pure optically homogeneous single crystal provides a system which is truly optically integral.

It should always be kept in mind that an optically integral fluorescent body does not by itself channel light along one direction. When used as a scintillator, the body is generally completely surrounded by a reflector except at the particular part of the body's surface which is to permit the light to reach the detector.

Combinations of the optically integral crystals of the present invention with photomultiplier tubes having their own anhydrous chambers or enclosures for the calcium iodide provide an article of manufacture capable of delivering an electrical signal substantially equal to that of a similar unit containing a crystal of thallium-activated sodium iodide.

The optically integral tin-activated calcium iodide crystals of the present invention advantageously may be used with conventional systems designed for counting radiation pulses or in systems designed for measuring integrated radiation intensities. The crystal is optically coupled to a means for converting the fluorescence of the crystal to electrical energy such as a photomultiplier tube and the like. The pulses of light emitted by the scintillator are converted to electrical signals corresponding to the energy of the radiation. In order to measure the pulse height, the integrated electrical signals are selected according to intensity, stored in magnetic or other accumulators and read out by any convenient means such as an oscilloscope or an electric typewriter.

The accompanying drawings forming part of the instant invention are to be read in conjunction therewith and in which.

Figure 1:
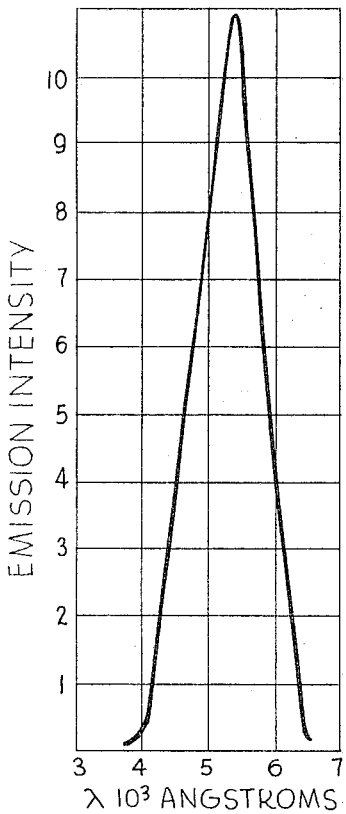
FIG. 1 illustrates a curve of the emission spectrum of one tin-activated crystal prepared according to the present invention obtained from excitation with cobalt[60].

In order that those skilled in the art may better understand how the present invention can be carried into effect, the following examples are given by way of illustration and not by way of limitation. All parts and percentages are by weight unless otherwise specified.

The following example sets forth a preferred method of preparing calcium iodide which is used as the basic starting material for growing the scintillation crystals of the present invention.

EXAMPLE A

In a suitable vessel of glass, stainless steel, or platinum, hydriodic acid (47 percent solution) 790 parts was added to calcium carbonate 215 parts stoichiometrically in excess of the calcium, boiled to remove $CO_2$, and made alkaline with calcium oxide. The resulting reaction mass in the form of a slurry was filtered for insolubles and made acid with additional 47 percent aqueous hydrogen iodide to a pH below 1. The filtrate was boiled to concentrate the solution through a continually rising boiling point to 146° C. The resulting highly concentrated liquor was cooled to 5° C. to form calcium iodide hexahydrate in crystalline form. The mother liquor was poured off and the crystals were spread loosely in an inert tray of quartz or a resinous material such as polytetrafluoroethylene to a depth of approximately 1 inch. The filled tray was then placed in a vacuum drying oven equipped with a vapor trap cooled with solid $CO_2$. The oven was then evacuated and pumping continued over a period of 24 to 48 hours, with no heat applied, until a pressure of 0.1 mm. Hg absolute or less was attained. The calcium iodide was then heated slowly to 75 to 80° C., over an interval of 40 to 60 hours, and held at this temperature for approximately 24 hours, or until a pressure of about 0.01 to 0.03 mm. Hg absolute was attained as measured by a Pirani-type vacuum gauge.

Roughly the above example is illustrative of the preparation of batches up to about 2000 grams or slightly higher spread out at a depth of slightly above 1 inch. Preferably the thinner the layer of material the better. Batches much larger than 2000 grams may not dehydrate as rapidly as the rates set forth in the above example; again this is more dependent on the depth of the material than the actual size of the batch.

The technique of heating and evacuating to dry a material is generally known to those skilled in the art. The evacuation procedure progresses at increasing rates depending on the temperature of the cold trap of the evacuating system, the colder the trap the more efficient the system. Liquified gases may be used to cool the trap.

The following example sets forth the preparation of a scintillation crystal according to the present invention.

EXAMPLE B

Figure 3:
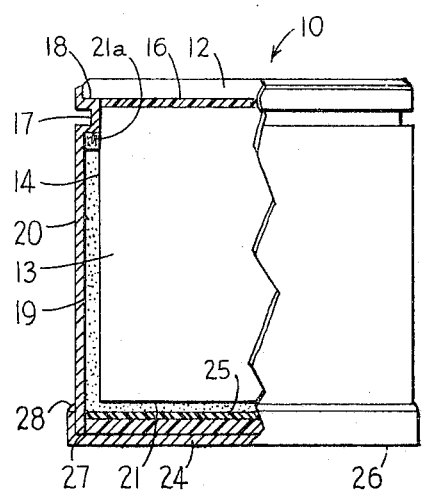
FIG. 3 illustrates partly in elevation and partly in cross-section a hermetically sealed container with a tin-activated calcium iodide scintillation crystal.

A 19 mm. O.D. fused quartz or Vycor ampoule was loaded with 44.1 parts of the calcium iodide as prepared in Example A and 0.17 part stannous chloride dihydrate in a dry box and evacuated and baked at a temperature of 250° C. for sufficient time to drive out residual moisture and air (6 to 18 hours, preferably 12 hours). The ampoule was sealed off under a vacuum of about 0.01 mm. Hg absolute or less and placed in a growing furnace of the Stockbarger type as described in U.S. Patent 2,149,076 with a top zone at about 800° C. and bottom zone about 650° C. After fusion and growth from the melt by lowering the crucible at a rate of about 1 to 6 mm. per hour, the ampoule and grown ingot were cooled to room temperature over a period of 24 hours, for example, in a container filled with insulating material such as Perlite or loose asbestos. The resulting crystal was removed from the ampoule in a dry box having a substantially anhydrous atmosphere (dew point below −60° C.), cut to size and "canned" in a hermetically sealed container such as shown in FIG. 3 of the drawing.

Preferably the rate of growth is kept below 10 mm. per hour and the pressure in the ampoule below 0.1 mm. Hg absolute. (Even trace leakage is undesirable.) Alternately the ampoule may be back-filled with an inert dry gas such as the noble gases.

Materials which may be employed to prepare the calcium iodide starting material used in growing the scintillation crystals of the present invention include reagent grade calcium carbonate as sold by Mallinckrodt Chemical Company and 47 percent aqueous solution of hydriodic acid which meets the specification for reagent purity. The purity specification of these materials are set forth as follows:

$CaCO_3$

| Impurities | Percent |
| --- | --- |
| Alkalinity | To pass test |
| (ACS Spec.) | |
| $NH_4$ | 0.003 |
| Ba | 0.005 |
| Cl | 0.001 |
| Heavy metals (as Pb) | 0.001 |
| Insoluble in HCl and $NH_4OH$ Ppt | 0.005 |
| Fe | 0.001 |
| Mg | 0.01 |
| Oxidizing substances as nitrate ($NO_3$) | 0.005 |
| Phosphate ($PO_4$) | 0.001 |
| Potassium (K) | 0.01 |
| Silica ($SiO_2$) | 0.001 |
| Sodium (Na) | 0.0026 |
| Strontium (Sr) | 0.10 |
| Sulfate ($SO_4$) | 0.005 |

Other alkalies to pass test (at least as good as ACS Spec). Assay ($CaCO_3$ after 2 hrs. at 285° C.) 99.95–100.05 percent.

| HI | Percent | HI | Percent |
| --- | --- | --- | --- |
| As | 0.0005 | $So_4$ | 0.005 |
| Cl+Br | 0.05 | P | 0.003 |
| HM as Pb | 0.001 | Free I | 0.088 |
| Fe | 0.001 | Sp. Gravity | 1.51 |
| Ignition Pres. | 0.005 | HI | 46.83 |

A spectrographic analysis of a sample of HI acid having the above specifications evaporated a non-volatile residue constituting 0.01 percent of the original liquid is set forth in the following Table III:

TABLE III

| | Values | | Values |
|---|---|---|---|
| Al | FT+ | Mg | T |
| B | VFT+ | Mn | VFT |
| Cd | T− | Ni | W |
| Ca | T | P | M− |
| Cr | W+ | Si | W |
| Cu | T+ | Ag | VFT+ |
| Fe | W | Na | T− |
| Pb | VFT | Ti | FT− |

Elements looked for but not found

| | | |
|---|---|---|
| Antimony | Germanium | Platinum |
| Arsenic | Gold | Strontium |
| Barium | Indium | Thallium |
| Beryllium | Lanthanum | Tin |
| Bismuth | Lithium | Vanadium |
| Cobalt | Mercury | Zinc |
| Gallium | Molybdenum | Zirconium |

The above specifications for the calcium carbonate and hydriodic acid reactants are given only as examples of a preferred maxima of impurities. Reactants having specifications outside the above maximum limits may be used also.

It is important, however, that the starting materials contain as little radioactive material as possible (for example the radioactive isotope of potassium). It is desirable that the amount of potassium be kept below 10 p.p.m. in the calcium iodide crystal.

The tin may be introduced into the calcium iodide as stannous chloride, stannous bromide, stannous iodide or any halide of tin preferably the stannous halide. Tin also may be introduced as the sulfide or any tin compound soluble in molten calcium iodide. On cooling, the tin compound forms a solid solution in molten calcium iodide.

Slow, controlled raising of the temperature during the heating to dehydrate is important because accelerated heating permits the water of hydration to react with the calcium iodide. Other methods may be used to prepare the dehydrated calcium iodide starting material of the present invention as long as heating of the hydrate is controlled. Instead of slowly heating the calcium iodide hydrate to complete the dehydration, the calcium iodide hydrate may be partially dehydrated and then distilled from a platinum crucible in a quartz tube at 820° C. See W. J. McCreary, J.A.C.S. 77, pp. 2113–4 (1955). Where the calcium iodide is heated up at such a rate the free iodine is observed due to pyrohydrolysis or reaction with oxygen, the resulting phosphor does not have the necessary properties for use as a scintillator even though it emits green light when exposed to gamma radiation.

The essential feature of the present invention is the growing of the instant bodies under controlled conditions. The rate at which the multiphase crystalline bodies of the present invention are grown depends on the temperatures of the two zones and the flow of heat through the growth interface. The rate of growth, crucible size, and the inside diameter of the crucible must be considered in determining the proper conditions necessary for obtaining a body having the desired physical characteristics. These factors are, of course, well known to those skilled in the art and need no further discussion.

Preferably, the melt should be mixed before and continually during the progressive solidification of the melt. When the Stockbarger procedure (supra) is to be used, a positive means of stirring may be necessary because there is little convection mixing, heat being applied from above.

In the Kyropoulos procedure (supra), mixing is inherent either from rotation of the solid as it is grown on the surface or from heat addition to the lower part of the melt.

Discontinuities in the materials comprising the charge move toward the heat source at a rate dependent upon vapor pressure of the material and the thermal gradient maintained in the solid. Where optical bodies are to be produced, the growth rate is especially important; these discontinuities, regardless of form, affect the light transmission characteristics. Thus for best results the growth rate should be several orders of magnitude slower than the flow of heat would permit. In other words, the amount of heat being conducted through the solidifying mass is several times ($10^3$–$10^5$+) the latent heat of fusion.

In melting and growing the material in a good vacuum, pressures less than 2 microns Hg absolute are preferred but pressures up to 10 mm. Hg absolute are tolerable. Atmospheres of the noble gases including argon, helium, and the like, and hydrogen can be used with the Kyropoulos procedure.

The amount of tin necessary to impart an emission wave length shift to the green region of the spectrum appears not to be critical. The characteristic emission peak of about 5300 ±60 angstroms is obtained from materials containing about 350 p.p.m. of tin and from materials containing less than 25 p.p.m. of tin. The apparent upper limit is the maximum amount of tin which can be placed in the lattice of the calcium iodide. This varies with growth rate, source of the tin and other factors well known to those skilled in the art. As the tin is increased in concentration, there is manifest a slight continual diminishing of properties such as light output.

Figure 2:
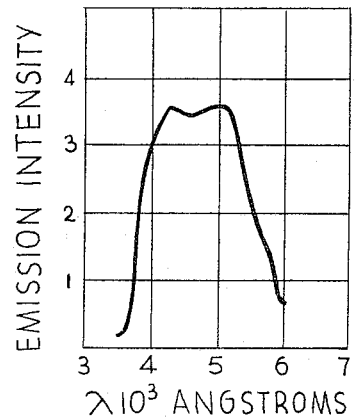
FIG. 2 illustrates another curve of the emission spectrum of a different tin-activated crystal prepared according to the present invention obtained from excitation with cobalt[60].

Referring to FIG. 1 of the drawing, there is shown the emission spectrum of a tin-activated calcium iodide crystal prepared according to Example B. The resulting crystal had 0.031 weight percent (310 p.p.m.) tin combined in the crystal analyzed by polarographic method. Attention is directed to the fact that the light emission has a single peak at about 5300 angstroms; thus the light emission is strongly green. As the amount of tin in the crystal is lowered in concentration, a second emission peak appears at about 4100 angstroms as shown in FIG. 2, the characteristic emission peak for pure calcium iodide (see copending application Serial No. 316,665, supra). The curve of FIG. 2 was obtained by cobalt[60] excitation of another scintillation material prepared according to Example B. However, this crystal analyzed spectographically at only 0.0022 part by weight (22 p.p.m.) tin. Both curves (FIGS. 1 and 2) show that an appreciable fraction of the light emitted lies in the green region (5100–5700 range). Moreover, 4100 angstrom emission may be detected also with high tin concentration if a very thin sample is used.

As indicated above, the scintillation crystals of the present invention may be used with all conventional light detecting means including photomultiplier tubes and those devices sensitive to light in the more visible region of the spectrum (e.g. CdS photoconductive cells, photographic film, and the like). Moreover, the crystals may be used as a visual radiation detector such as in a fluoroscope and the like.

The pulse heights of the crystals used to obtain the curves of FIG. 1 and FIG. 2 were measured with a conventional system such as is shown schematically in FIGS. 6 and 7 (see description infra); the specific components used were as follows: a photomultiplier comprising a 3-inch tube having a photocathode with S–13 cathode spectral response and 10 secondary emitting elements (dynodes) e.g. and RCA 6903; a linear amplifier based on the Argonne A–61 design for use with scintillation crystals; amplifiers based on this well known design accept the negative going pulses of the photomultiplier tube, amplify and invert them to a peak height maximum of 100 volts (one particular model based on this design in the Model 30–7 of Radiation Instrument Development Laboratories, Inc.); a multi-channel analyzer of the type described in an article by R. W. Schumann et al., Rev. Sci. Instrument, 27, 675 (1956); a transistorized model based on this design is the Model 34–12 having 400 channels (sold by the Radiation Instrument Development Laboratories, Inc.); and a capacitor having a resistance of 200,000 ohms of 220K. and a capacitance of 40μμf (micro microfarads). The radiation source was cesium[137].

The crystal used to obtain the curve of FIG. 1 had a pulse height 95.5 percent relative to a standard thallium-activated iodide [Standard commercial thallium-activated sodium iodide scintillation crystal containing from about 0.07 to about 0.40 percent thallium iodide (see report by J. A. Harshaw et al.; A.E.C. Report NYO 1577; (1952))], and the crystal used to obtain the curve of FIG. 2 had a pulse height 117 percent relative to the same sodium iodide crystal.

It has been found that the values for the pulse height measurement of the crystals prepared according to the present invention can be correlated roughly with the pH of an aqueous solution of the crystalline material. Ten percent solutions of a selected part from each sample are made up using deionized water and tested immediately for pH using a Beckman glass electrode pH meter. The part selected is carefully freed from the outer surface where a small amount of hydrolysis possibly might have taken place. It is found that the solutions of the better samples have a pH in the range of from 6 to 9 and that the solution of the poorer samples have a pH ranging from 9 to 10.5. Solutions of the excellent samples have a pH between 6.5 and 8.

While the reasons for this rough correlation are not fully understood, one possible explanation is that the higher pH values indicate that the better samples were prepared with less pyrohydrolysis or oxygen pick-up and were therefore less contaminated by calcium oxide or basic iodides. It is to be understood by those skilled in the art that this possible explanation is not to be construed necessarily as being accurate; it is offered only to aid those skilled in the art in understanding the invention and not to limit any any way the scope thereof.

After the samples were tested for properties as scintillators, they were analyzed spectrographically for impurities using a Jarrell-Asch spectrograph. The only impurities found to be in the samples other than tin are aluminum (Faint Trace), copper (Very Faint Trace), iron (Very Faint Trace), lead (Very Faint Trace), magnesium (Trace 0.001–0.01% by weight), silver (Very Faint Trace) and silicon (Faint Trace).

Elements looked for but which were not found were the following: antimony, arsenic, barium, beryllium, bismuth, cadmium, cobalt, gallium, germanium, gold, indium, lanthanum, lithium, mercury, molybdenum, phosphorus, thallium, and europium.

The calcium iodide scintillators of the present invention may be made having various pulse-heights depending on the degree of care taken in preparing and growing the crystal. The invention is intended to include all of those materials which are useful as scintillators particularly those having pulse-heights of at least 30 percent of the standard thallium-activated sodium iodide and preferably at least 60 of said standard. While the materials of the present invention may be made consistently to have a decay constant of 0.50 microseconds or less, materials having a decay constant of up to 10 microseconds or even higher are considered useful and therefore form part of the present invention.

The calcium iodide crystals of the present invention being substantially transparent down to about 3800 angstroms absorb very little radiation having wave lengths above this value, although there is noticeable fluorescence from the crystals when they are being impinged with radiation having wave lengths up to 3650 angstroms.

For scintillating purposes the crystals of the present invention may be used effectively to detect and analyze radiation having energies as low as 33 kev. (kiloelectron volts). However, the crystals do give off light from radiations having energies as low as 3.4 e.v.

When used as scintillators the tin-activated sodium iodide may be used with systems for detecting and analyzing ionizing radiations from atomic energy reactors such as betatrons and cyclotrons, nuclear fission and fusion, synchrotrons and X-ray apparatuses. The type of radiation to be detected or analyzed partly determines the minimum mass needed to stop a significant amount of radiation. It has been found that crystals having thicknesses as low as 0.003 inch may be used to detect X-rays. A scintillator, however, must be at least 0.01 inch thick to stop enough gamma radiation to be useful.

As previously mentioned, the scintillation crystals of the present invention are extremely hygroscopic and must be kept at all times in a substantially anhydrous atmosphere. When packing, canning or using the instant crystals, it is of advantage to perform all of the operations in an atmosphere having a dew point of −60° C. or less. Moreover, if for some reason the crystal is to be used outside of a hermetically sealed container such as in FIG. 3 (see description infra) it is considered within the scope of the invention to house the entire detector or analyzer apparatus in a dry chamber along with the crystal.

Referring now to FIG. 3, there is shown a hermetically sealed scintillator unit 10 designed for universal usage. The unit 10 generally comprises a cylindrical container body 11 having a transparent glass or quartz window 12 hermetically sealed at one end thereof and a calcium iodide crystal 13, prepared according to the present invention, optically coupled to the inner side 14 of the window 12. Optionally a layer 16 of an optical fluid is used to insure a uniform optical coupling across the entire surface between the window 12 and the calcium iodide crystal 13.

A square cross-sectioned annular groove 17 in the container body 11 conveniently provides an annular seat 18 supporting the window 12. The window is hermetically sealed in the seat 18 with a moisture impermeable material such as an epoxy resin and the like.

The calcium iodide crystal 13 is held firmly against the window by a highly reflective packing 19 surrounding the outer cylindrical surface 20 and the bottom surface 21 of the crystal 13. Granular aluminum oxide or magnesium oxide which have been dehydrated are particularly preferred as the packing material. A minimum amount of a fibrous material 21a such as fiberglass may be packed around the extreme upper portion of the crystal 13 to prevent the granular packing from being sifted beyond the annular groove 17.

Beneath the packing 19 and the crystal 13 is a compressible pad 24 composed of a material such as sponge rubber, and optionally there is a polyethylene disc 25 between the pad 24 and the packing 19.

A back cap 26 fitting over the lower end of the container body 11 supports the assembled contents of the unit. Preferably the pad 24 extends slightly axially beyond the bottom of the container body 11 so that the pad 24 is maintained under compression by the cap 26 whereby the crystal 13 is being forced continually against the inner surface of the window 12 from the biasing action of the pad 24.

The cap 26 is hermetically sealed to the container body at the inner juncture 27 and the outer juncture 28 of the cap with the body. A moisture impermeable material similar to that used for sealing the window 12 to the body may be used.

Preferably the container body 11 and the cap 26 are composed of a radiation permeable material for obvious reasons. Examples of such material include aluminum, magnesium, etc.

Figure 4:
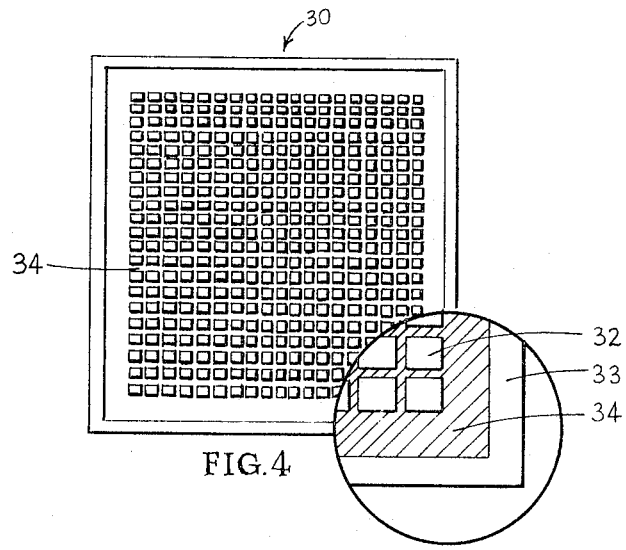
FIG. 4 illustrates schematically a fluoroscope screen.

Referring to FIG. 4 of the drawing, there is shown schematically a fluoroscope 30 comprising a mosaic screen 31 of multiple uniform pieces 32 comprising tin-activated calcium iodide prepared according to the present invention set in a frame 33. Partitioning each piece 32, is a reflective material 34, optically isolating the pieces from one another. The mosaic screen 30 is set in a conventional manner. The reflective partitioning material 34 may advantageously be a resin such as an epoxy and the like (Accobond), or the material may be white rubber or the like. In order effectively to protect the crystals from the air, optically exposed faces 36 of the crystals are sealed from the ambient atmosphere with a transparent resin such as epoxy, polymethylmethacrylate polystyrene and the like. In order for the screen 30 to present a resulting image most effectively, the partitioning material 34 preferably defines cylinders having parallel axes. In the drawing, each axis is perpendicular to the surface thereof.

Figure 5:
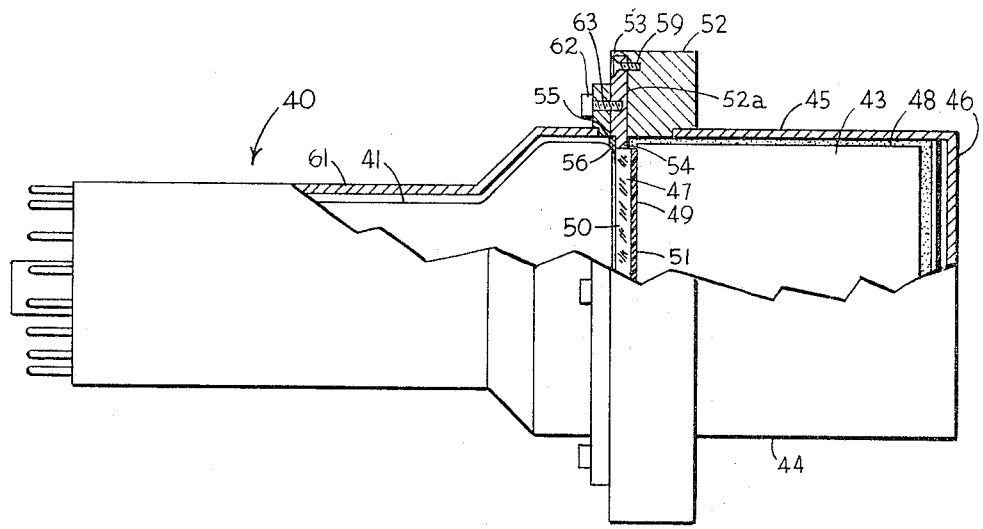
FIG. 5 illustrates partly in elevation and partly in cross-section a calcium iodide crystal of the present invention enclosed in a hermetically sealed container optically coupled to a photomultiplier tube.

Referring to FIG. 5 of the drawings, there is shown an assembly 40 as a unit comprising a photomultiplier tube 41 having a light sensitive end 42 optically coupled to a calcium iodide crystal 43 of the present invention encased in a moisture-proof chamber 44 extending axially beyond the body of the tube 41. The moisture-proof chamber generally comprises a cylindrical wall 45 with an integral flat bottom 46 and an opening 47 facing the interior of the photomultiplier tube. The chamber is composed advantageously of a radiation permeable material such as aluminum, stainless steel, and the like.

The crystal 43 is snugly packed in a substantially anhydrous granular material 48, highly light reflective in character. The top 49 of the crystal is optically cemented to a transparent window 50 of glass or quartz with a layer 51 of an optically transparent cement. Preferably, an epoxy resin is used such as (R-313 sold by Biggs & Co.).

Coaxially surrounding the upper end of the wall 45 is an outwardly extending flange 52 provided with an annular recessed seat 52a. A ring 53, flushly fitted into the seat 52a, is provided with a radially inwardly extending thinner portion 54 providing a seat 55 for registering the light sensitive end 42 of the tube 41 with the opening 47. A ring 56 of an epoxy resin (R-313) is used advantageously to fix firmly the tube to the seat 55. The ring 53 is drawn tightly into the seat 52a by a series of bolts 57 passing through holes 58 (one shown) and threadedly engaging tapped holes 59 in the flange 52. The inner portion 54 being radially coextensive with an outer portion 60 of the window forces downwardly the window together with the crystal 43 and the granular material until the desired compactness is attained.

A magnetic shield 61 surrounding the tube 41 supports an outwardly extending flange for securing the tube 41 to the chamber 45 with a series of bolts 62 extending through holes 63 (one shown) and threadedly engaging a series of registering tapped holes 64 annularly spaced about the ring 53.

As hereinbefore indicated, the tin-activated calcium iodide crystals prepared according to the present invention may be used advantageously as scintillators in a conventional system for measuring radiation pulse-height. The scintillation crystals of the present invention particularly may be used in systems designed for measuring integrated radiation output or intensity.

Figure 6:
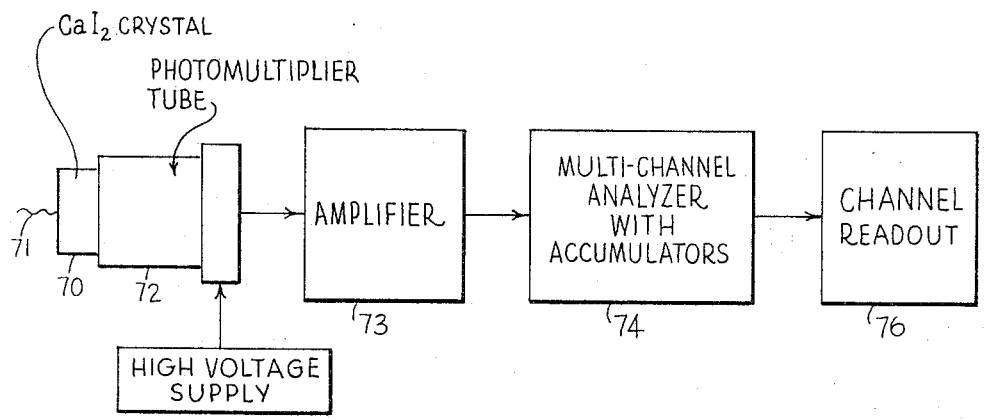
FIG. 6 is a diagram in functional block form illustrating the components of a detector system which may be used in combination with the calcium iodide crystals of the present invention.

Exemplary of such a system is that shown in FIG. 6 wherein a scintillation crystal 70 prepared according to the present invention is placed in the path of ionizing radiations 71 to be measured. The scintillation crystal 70 is optically coupled to a photomultiplier tube 72 (see FIG. 5 supra) which responds to fluorescent light or photons being emitted from the crystal as it is being impinged by the radiation 71, converting the photons into negatively going electrical pulses or signals. These signals are fed to a linear amplifier 73 coupled electrically to the output of the photomultiplier tube 72 via a preamplifier, and a delay line (see FIG. 7 infra). The linear amplifier 73 gives a voltage proportional to the impressed charge from the photomultiplier 72. A multichannel analyzer 74 electrically connected to the amplifier 73 receives infinitesimally spaced electrical pulses which vary in magnitude, sorts them according to their intensity and stores them in an array of magnetic accumulators each of which is capable of counting the signals or pulses received by the particular accumulator. The stored signals may then be read out by a suitable device 76 such as an electric typewriter, etc.

Figure 7:
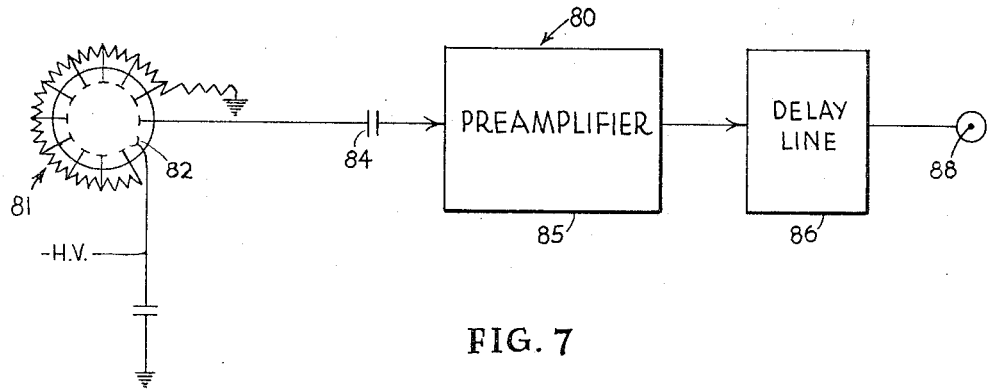
FIG. 7 is a diagram in functional block form of a conventional pulse transmitting and pulse shaping system for connecting a photomultiplier to an amplifier such as in the arrangement illustrated in FIG. 6.

Referring to FIG. 7, there is shown in block form a conventional pulse transmitting and shaping system 80 for transforming the electrical signals or pulses generated by the photomultiplier tube 81 into signals having the proper characteristics for analysis.

The output or last dynode 82 is coupled through a capacitor 84 to a preamplifier 85 providing a driving source to transmit effectively the signal received from the photomultiplier 81. While a cathode follower is commonly used as the preamplifier, a low impedance circuit such as the White follower is preferred. The output of the preamplifier is then fed to a delay line 86 where the pulse or signal is shaped into a square wave of very brief duration. The characteristics of the shaped pulse are such that successive pulses may be differentiated easily from each other. Each shaped pulse is then received at the terminal 88 which may be coupled electrically to a linear amplifier in a system such as shown in FIG. 6.

The scintillation crystals of the present invention may be used in other conventional systems for the detection and/or analysis of ionizing radiations. For examples of systems which may advantageously use the instant tin-activated calcium iodide crystals, reference is made to the U.S. Government publications by the Atomic Energy Commission ORNL–2808 Orins–30 relating to Biology and Medicine. The former is by D. A. Ross, Medical Gamma-Ray Spectrometry, Oak Ridge Institute Nuclear Studies and the latter is by C. C. Harris et al., Basic Principles of Scintillation Counting for Medical Investigators, Oak Ridge National Laboratory.

Although specific embodiments of the invention have been shown and described, it will be understood that they are but illustrative and that various modifications may be made therein without departing from the scope and spirit of this invention as defined in the appended claims.

What is claimed is:

1. A scintillator comprising an optically integral crystalline material comprising tin-activated calcium iodide, said tin being present in amounts ranging from about 10 parts per million to about 400 parts per million based on the weight of said material.

2. A scintillator comprising a transparent optically integral crystalline material consisting of tin-activated calcium iodide, said material being characterized by having an emission peak at about 5300±60 angstroms and an emission band within the range of from about 3500 to about 6000 angstroms, said tin being present in amounts ranging from about 10 parts per million to about 400 parts per million based on the weight of said material.

3. A scintillator comprising a transparent, optically integral crystalline material having a thickness of about three-thousandths of an inch consisting of tin-activated calcium iodide, said scintillator having a decay constant of less than 0.50 microseconds, said tin being present in amounts ranging from about 10 parts per million to about 400 parts per million based on the weight of said material.

4. A composition of matter comprising calcium iodide and tin, said tin being present in amounts ranging from about 10 parts per million to about 400 parts per million based on the weight of said composition.

(References on following page)

References Cited by the Examiner

UNITED STATES PATENTS

| | | | |
|---|---|---|---|
| 2,829,264 | 4/1958 | Garrison | 250—80 X |
| 3,068,359 | 12/1962 | Carlson | 250—71.5 |
| 3,127,512 | 3/1964 | Monaghan | 250—71.5 |
| 3,225,193 | 12/1965 | Hilton et al. | 250—71 X |

OTHER REFERENCES

Scintillations in Thallium Activated $CaI_2$ and CsI by Sciver et al., Physical Review, vol. 84, 1951, pp. 1062, 1063.

RALPH G. NILSON, *Primary Examiner.*

ARCHIE R. BORCHELT, *Examiner.*